United States Patent [19]
Sanda, Jr.

[11] 3,855,177
[45] Dec. 17, 1974

[54] PNEUMATIC TIRE TREADS AND THEIR PRODUCTION

[75] Inventor: Joseph C. Sanda, Jr., Akron, Ohio

[73] Assignee: The Firestone Tire & Rubber Company, Akron, Ohio

[22] Filed: June 8, 1972

[21] Appl. No.: 260,869

[52] U.S. Cl............ 260/42.47, 152/330, 260/37 N, 260/77.5 CR, 260/77.5 AM, 260/887, 260/859 R
[51] Int. Cl.......................C08g 51/04, B60c 1/00
[58] Field of Search... 260/37 N, 77.5 CR, 77.5 CH, 260/42.47; 152/330

[56] References Cited
UNITED STATES PATENTS

| | | | |
|---|---|---|---|
| 2,749,960 | 6/1956 | Schwartz | 152/330 |
| 3,107,235 | 10/1963 | Larson | 152/330 |
| 3,208,500 | 9/1965 | Knipp | 152/330 |
| 3,427,366 | 2/1969 | Verdol | 260/77.5 CR |
| 3,436,359 | 4/1969 | Hubin | 260/77.5 CH |
| 3,489,723 | 1/1970 | Kraft | 260/37 N |
| 3,648,748 | 3/1972 | Lovell | 152/330 |
| 3,701,374 | 10/1972 | McGillvary | 152/330 |

Primary Examiner—Morris Liebman
Assistant Examiner—P. R. Michl

[57] ABSTRACT

In the production of vehicle tires, a vulcanizable tread composition which includes a reinforcing agent is applied to the tread portion of a tire mold and a tire body is then positioned in the mold against this tread, as by casting the tire body. The tread is prepared from an elastomeric polymer selected from the class consisting of (a) polyamino polyethers and polyesters, and (b) polyamino polymers of aliphatic olefins, by reacting the same with a diisocyanate in a one-step reaction. Alternatively, polyhydroxy polymers may be blended with these polyaminio polymers or with diamino-non-polymeric materials to produce urea-urethanes in a one-step reaction, such as (a) polyhydroxy conjugated diene homopolymers or copolymers, (b) polyhydroxy copolymers of a conjugated diene and an aromatic vinyl monomer, (c) polyhydroxy copolymers of a conjugated diene and a vinyl nitrile monomer, (d) copolymers of such polyhydroxy polymers and diamino non-polymeric materials and (f) copolymers of polyamino polymers and dihydroxy non-polymeric materials. The ratio of the reactants represented as NCO/NHR or NCO/[OH+NHR] in which R is hydrogen, an alkyl or aryl radical, must be at least about 1.15 or higher up to 2 or even 3 or higher. Auxiliary peroxide, etc. cures of the the blends of the polyamino polymers with (a) polyhydroxy conjugated diene homopolymers or copolymers and (b) polyhydroxy copolymers of a conjugated diene and an aromatic vinyl monomer and polyhydroxy copolymer of a conjugated diene and a vinyl nitrile monomer or blends of such polyhydroxy polymers and copolymers with diamino non-polymeric materials may also be used.

3 Claims, 1 Drawing Figure

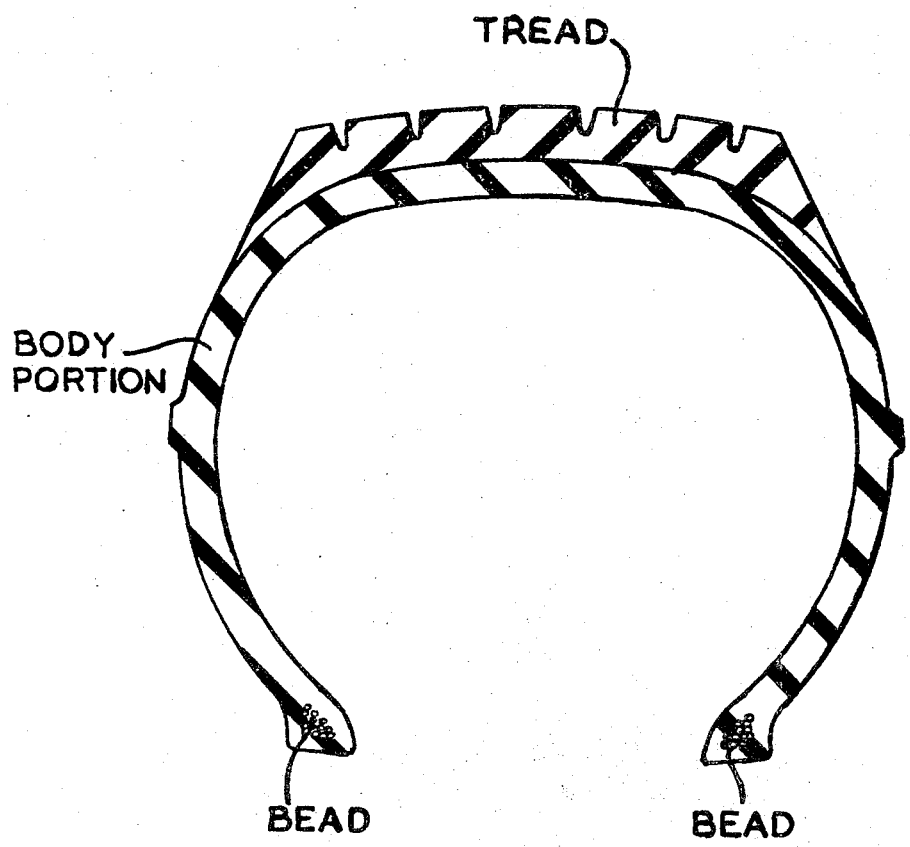

PNEUMATIC TIRE TREADS AND THEIR PRODUCTION

BACKGROUND OF THE INVENTION

This invention relates to a novel process for producing vehicle tires. The tire body of a liquid rubber composition preferably is centrifugally cast and is therefore preferably free of reinforcing elements although it may contain short fibers, reinforcing pigments, etc. dispersed therein. The tread is not cast, but is usually placed in a mold and the tire body is cast against it. Alternatively, a conventional solid tire body may be positioned against the tread and the tread cured onto this body. An adhesive may be used if necessary. The invention includes the new uncured compositions, new treads and method of producing them.

The tread which includes a reinforcing agent such as carbon black or silica or a metal oxide, etc. is formed from a polyurea, a reaction product of (1) a polymer which contains at least two amino groups and (2) a polyisocyanate. The polyamino polymer is derived from the class consisting of polyethers and/or polyesters (e.g., polyoxypropylene, polytetrahydrofuran, polypropylene glycol, polyethylene glycol, polycaprolactone, polyethyleneterephthalate, polypropylene azelate, polybutylene adipate, etc.) Alternatively, substantial amounts of polyhydroxy polymers may be blended with substantial amounts of these polyamino polymers or with diamino-non-polymeric materials, such as ethylene diamine, Tenamene-4, MOCA, the polyhydroxy polymers being derived from the class consisting of (a) conjugated diene homopolymers or copolymers (e.g. polybutadiene, polyisoprene, polychloroprene, polypiperylene, butadieneisoprene, etc.), the diene of which contains 4 to 6 carbon atoms, (b) copolymers of such a conjugated diene and an aromatic vinyl monomer (e.g. butadiene-styrene, isoprene-styrene, butadienevinyl naphthalene, butadiene-alpha-methyl styrene, etc.) and (c) copolymers of such a conjugated diene and a vinyl nitrile monomer (e.g. butadiene-acrylonitrile, isoprene-acrylonitrile, butadiene-alpha or beta-methacrylonitrile, etc.) The foregoing copolymers refer to rubbers produced from monomers of the usual monomer percentage ranges, and copolymers of other suitable monomer ranges. The polymer of the tread may comprise mixtures of the foregoing polymers and polyisocyanates or mixtures of any one or more of the foregoing and other rubber such as conventional solid rubber, reclaim rubber, scrap vulcanized rubber, etc.

Any of the usual diisocyanates may be used in producing the polyurea or poly(urea-urethane); although it is conceivable that a reactant or a mixture of reactants containing more than two isocyanate groups may be employed. It will be understood that references to diisocyanates herein include such compounds and mixtures. Thus, a polyamino rubber of any known type may be used, as well as other isocyanate-extendable polymers, and elastomeric products containing no unsaturation may be used alone or mixed with rubbers. usually the elastomers will contain but two reactive groups but may contain more, up to three or four or five or more primary and/or secondary amino groups on the average. Solid rubber, scrap rubber, reclaimed rubber, etc., may be blended into the tread composition. The tread of this invention will include any substantial amount of a vulcanizate derived from a polymer with a backbone containing two or more amino groups extended with a polyisocyanate, and the elastomer of the tread may contain any amount thereof up to 100 percent. If desired, the isocyanate cure can be supplemented with a peroxide, sulfur, etc., cure in the case of blends with the polyhydroxy polymers.

The reaction of diisocyanates with amino-terminated materials, or with these materials blended with hydroxy-terminated polymers, in one-step urea or urea-urethane synthesis, is not new. For example, in Sinclair's *PRODUCT DATA BULLETIN* No. 505 (revised June, 1967), pages 18 to 27, examples of one-step ureaurethanes are given for NCO/[OH + NHR] ratios of 1.0 to 1.1. Reference is made to the use of these compounds in automotive tires, but the bulletin does not show how this can be done. Reference is made also to the use of auxiliary peroxide and sulfur cure systems, but no examples are given. The invention of this patent application relates not to tires generally, but to tire tread compositions. In the above bulletin there is considerable discussion of the NCO/[OH + NHR] ratio in one-step urea-urethane reactions and, more particularly, such reactions in which the NCO/[OH + NHR] ratio is 1.0 or 1.1 with compositions containing carbon black or silica or zinc oxide (or other metal oxide), but the bulletin makes no reference to compositions suitable for use as tire treads. Higher ratios are mentioned in that bulletin when such fillers are not present, but in a tire tread it is necessary to employ some such reinforcing agent as mentioned, and it is a feature of this invention that with such reinforcing agents a ratio of greater than 1.1 has been found most satisfactory. In fact, ratios of 1.15 or 3.0 or greater, such as 4.0 or 5.0 or even more, have been found satisfactory, depending upon the filler present.

If one uses a blend of polyamino polyether or polyester or a polyamino non-polymeric material with polyhydroxy polymer or copolymer and the ratio is 1.1 or less, with carbon black or silica, an auxiliary peroxide or sulfur, etc. cure is needed to produce a satisfactory vulcanizate. In such cases when peroxide is omitted, treads perform poorly, as they tend to have excessive heat build-up, causing blowing.

In the production of tires by centrifugal casting, a number of elastomeric materials have been used. These materials are selected for their properties of pourability, with a subsequent hardening into a rubbery state suitable for use in vehicle tires, either pneumatic or non-pneumatic. It has been found, however, that the desired properties for the tread of a tire, such as skid resistance, etc., are not compatible with those properties required in sidewall areas, such as strength and a high modulus, for example. Accordingly, composite tires have been suggested, in which dissimilar materials are employed for the tread portion and the tire body. One such construction employs a pre-formed tread section of a solid natural or synthetic rubber compound which is placed in a mold, sidewalls of a polyurethane compound being centrifugally molded thereon to form a composite tire. See British Pat. No. 1,118,428. The principal difficulty with this type of construction is that of obtaining good adhesion between the tread and the tire body, since these materials are quite dissimilar chemically.

There is much art on forming polyureas and polyureaurethanes some of which are similar to compositions referred to herein, but it is submitted that the use of such compounds as disclosed herein, in the production of tire treads separate from tire bodies, as claimed herein, is new and patentable. Hsieh U.S. Pat. No. 3,175,997 refers to the use of polyurethanes as conventional tread stocks, etc., but does not tell how to make a good tread to which a tire body of different composition is united.

THE INVENTION

Tread stocks used in carrying out this invention are to be distinguished from other tire stocks because they must have good traction, both wet and dry, and skid resistance. It is important that, if a tire skids, the tread is not heated to such an extent that the rubber is melted sufficiently to prevent the tire from having good skid resistance. Tread stocks must be abrasion resistant in order to have long life. Also, uncured tread stocks may be much stiffer than those used in the body of a tire.

The tread stock may be a blend of the different polymers described herein and may contain small amounts of other elastomers. It will comprise at least 25 or 50 percent or more of a polymer referred to herein. The polymers referred to herein are derived, at least in part, from polyamino elastomers, from blends of polyamino elastomers and polyhydroxy elastomers, or from blends of polyhydroxy elastomers and non-polymeric diamino compounds. The polymers in many cases have more than two such reactive groups per chain; as many as five or more in some cases. However, the average functionality usually should be no more than 3.0. Functionality is determined here from amino content data (e.g., data obtained by HCl titration) and molecular weight data (e.g., VPO molecular weight, dilute solution viscosity molecular weight, gel permeation chromatrography, etc.), and considerable difficulties exist in obtaining accurate functionality in this manner.

The preparation of a polyurea from amino-terminated polyoxyalkylene and 2,4-toluene diisocyanate may be illustrated by the following equation:

nected with the polyoxyalkylene units. Regardless of the number of amino groups, an equal number of isocyanate groups is required to complete the reaction, as illustrated in the equation. The ratio of —NCO/—NHR as represented by the formula is at least 1:15 and this is true regardless of the number of amino groups (primary or secondary) present and regardless of what diisocyanate is employed in carrying out the reaction. The diisocyanates are very active and react with any moisture present, and react with other impurities and also are reactive with materials compounded with the polyurea such, for example, as functional groups present on carbon black or silica, etc., surfaces. Thus, when carbon black or other impure or reactive component is compounded with the polyurea (or urea-urethane) as in the compositions of this invention, excess isocyanate over and above that required for a 1:1 NCO/NHR ratio must be added in order to react with water, etc. Also, some excess isocyanate is desirable to effect crosslinking by means of biuret formation. Reaction of water with isocyanates produces a primary amine which, in turn, enters into the chain extension reaction and crosslinking reactions by formation of ureas and biurets.

Compositions of matter are disclosed in which the NCO/NHR ratio (or NCO/[OH + NHR], where R may be hydrogen, an alkyl or aryl group) is 1.15 or 1.3 or 1.5 or higher up to 3 or more in the one-step urea (or urea-urethane) synthesis in which a reinforcing agent is used, all as illustrated herein. It was surprising to find that good vulcanizates were obtained with stocks in which such high ratios were utilized in the one-step reaction. It was previously thought that such high ratios would produce inferior and undercured stocks because a substantial portion of the amino(or amino and hydroxy) groups would be converted to isocyanate groups and this in turn would prevent efficient chain extension. The advantage of using higher ratios is illustrated in the examples.

The amount of diisocyanate to be used depends upon

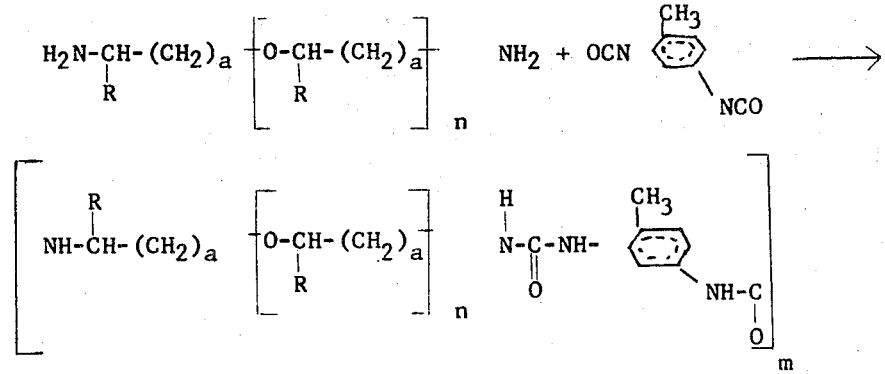

in which R represents H or $CH_3$, a is 1 to 3 and n represents the number of polyoxyalkylene groups in the polymer and m represents the number of polyurea repeating units. In the reaction, n will have a value of from 10 to 250 or even 300, giving molecular weights of substantially 600 to preferably about 3,000, or 5,000 or 15,000, for example; and m is such that the molecular weight of the polymer is, for example, 20,000 or more after chain extension. Such reactions are well known in the art. Although the amino groups are represented as being terminal, it is generally presumed that this is the case although they may not be terminal in all cases. There may be more than two amino groups connected with the polyoxyalkylene units. Regardless of the following: (1) the molecular weight of the polymer; (2) the functionality of the polymer; (3) the molecular weight of the chain-extending agent; (4) the functionality of the chain-extending agent; (5) the amount of impurities (such as water) and (6) the reactive sites on the surfaces of fillers used, such as carbon black, etc. For instance, the amount of moisture present with the commercial carbon black may vary, and the amount of carbon black used may vary from 35 or less to 200 or more parts per 100 parts of polymer. Thus, it is impossible to accurately suggest the amount of such chain-extending agents to be used.

It is evident from the art that a wide variety of diisocyanates may be used in carrying out the invention as, for example, toluene (a mixture of 2,4 and 2,6 isomers) diisocyanate, dianisidine diisocyanate, diphenyl methane diisocyanate, hexamethylene diisocyanate, bitoluene diisocyanate, polymethylene polyphenyl isocyanate, etc. The amount of diisocyanate required to produce a good cure depends somewhat upon the structure of the diisocyanate employed.

The diisocyanate reaction may be catalyzed by any of the conventional urethane catalysts such as dibutyl tin dilaurate, 1,4-diazabicyclo[2,2,2] octane (DABCO), stannous octoate, etc. Dibutyl tin dilaurate is especially useful, in that high and low temperatures may be used in curing. DABCO causes reversion at high e.g. 300° F. and over) temperature cures.

This diisocyanate reaction is directed towards a one-step polyurea or urea-urethane synthesis reaction as opposed to the two-step urea or urea-urethane reaction.

In the one-step reaction involving NCO and NHR (or NHR + OH) groups, sufficient isocyanate is added to effect a complete cure. This type of reaction is characterized by a short pot life (for example less than 3 hours) after the isocyanate has been mixed into the compound. By contrast, in the two-step urea or urea-urethane synthesis, approximately twice as much isocyanate is added to the compound. This effects the conversion of all amino (or amino and hydroxy) groups into isocyanate groups and in an inert atmosphere pot life is indefinite (e.g. 3 months or more). At this stage the compound is said to be in the pre-polymer form. Pre-polymers are then cured generally by addition of dialcohols such as pentane diol, etc., or by diamines such as methylene-bis-ortho-chloroaniline. Actually, the tire bodies used in making tires from the treads of this invention may involve a two-step urethane reaction, and such bodies are combined with a one-step tread formulation.

The compounding ingredients in the tread stock can include any type of reinforcing agents, e.g., carbon black such as GPF, ISAF, SAF, etc., precipitated silica, etc. Any type of processing oil can be used such as paraffinic, naphthenic and aromatic oils, dioctyl phthalate, etc. The higher aromatic oils appear to offer some advantages over the others.

The word "pigment" as used herein includes sulfur, peroxides, reinforcing pigments, antioxidants, antiozonants, fillers, etc.

Various types of antioxidants, antiozonants and the like may be employed as suggested by the prior-art use of such compounds in rubbers. However, the hindered phenols are probably the most useful since they probably are least reactive with isocyanates.

Any peroxide, such as dicumyl peroxide, benzoyl peroxide, etc. may be used for auxiliary peroxide cures.

The procedure for making tread stocks usually involves two steps. In the first step, the polymer and all compounding ingredients except the chain-extending agents are pre-mixed and ground down, preferably on a three-roll paint mill, Attritor mill, a Brabender mixer, etc. so that the reinforcing and other pigments are finely dispersed. This material is referred to as a masterbatch and has indefinite shelf life. In the second step, the chain-extending agent is mixed into the masterbatch and the resulting tread compound is put into the tire mold just before the tire body is cast onto the tread. The mixing is conveniently effected on the same apparatus as used to make the masterbatch or in another mixing chamber such as a Baker-Perkins mixer. The time interval between mixing the chain-extending agent into the masterbatch and casting the tire body onto the tread stock should be as short as possible. Adhesion of tread to body is dependent upon little chain extension of the tread stock prior to adding the body to the mold. The chain-extension rate can also be controlled by varying catalyst level and oil level.

The foregoing is illustrative, and other procedures and apparatus may be employed as desired.

The drawing is a section of a tire prepared according to this invention. The tread may be of a desired thickness and the dividing line between the tread and the body of the tire may be varied in location and configuration.

The invention provides a tread composition on to which a tire body may be centrifugally molded. A conventional tire body also may be positioned against the tread. The tread and sidewall portions have dissimilar properties yet are firmly attached to produce an integral structure. An adhesive may be used in uniting them.

The tire is usually formed by first locating the tread stock in a tire mold and then centrifugally casting a liquid tire body-forming composition against the tread and curing both the tread and the tire body compositions together thereby forming a strong bond between them.

Reinforcing cords or plies may be placed in the mold over the tread before casting the tire body, but no reinforcement is necessary; short reinforcing filaments may be compounded with the tread stock, if desired.

If polybutadiene units are present in the backbone of the polymer in the tread, whatever the elastomer from which the polymer is derived, it preferably comprises some 1,2-structure, and the 1,2-structure may be as high as 60 percent but 5 percent to 15 percent is preferable for wear and low temperature properties.

In producing the tread stock, polyamino polymers may be freely mixed or interchanged among themselves and/or with polyhydroxy polymers, or polyhydroxy polymers with diamino-nonpolymeric materials, and the chain extension can be accomplished by mixing chain-extending agents therewith.

In commercial production there usually will be moisture and perhaps other impurities present in the polymer, carbon black, and other pigments which together form the masterbatch. Therefore, ratios of chain-extending agent to reactive terminals of at least 1.15 will be needed. Usually a ratio of 1.3 or 1.4 or higher will be required to insure the presence of sufficient diisocyanate for the polyurea or poly(urea-urethane) reaction. In commercial production it will not be efficient to dry the compounding ingredients or provide a uniform moisture content from batch to batch, so it is necessary to determine the moisture content of each batch, preferably after compounding with carbon black or other compounding ingredients, before carrying out the reaction with the diisocyanate, and to use sufficient diiosocyanate to react with the moisture and amino- or amino-plus hydroxy polymers or compounds, and avoid any substantial excess, although a slight excess will usually be used. The tread of a tire is dependent upon the use of sufficient diisocyanate to react with the amino and hydroxy groups of the compound and may depend upon whether sufficient is present to react with other reactive groups that are present.

Although the moisture content of a masterbatch is difficult to determine, the problem is conveniently circumvented by curing small quantities of a masterbatch with different amounts of chain-extending agent to give different ratios and selecting from these the one ratio which gives the desired vulcanizate properties.

TIRE PRODUCTION

The art refers to apparatus which may be used in the casting of tires, such as disclosed in Beneze Pat. No. 3,555,141, for instance. Such apparatus or improvements upon the same may be used in producing the tires from the tread compositions of this invention. The beads are supported in the mold cavity in any suitable manner. The tread is suitably located in the tread portion of the mold before casting the tire body against it. Compositions suitable for casting the body are known in the art. See, for example, British Pat. No. 1,139,643.

DESCRIPTION OF PREFERRED EMBODIMENT

The present invention relates to the production of tread-stock compositions in a mold. The tire body may be centrifugally cast in the mold on to the tread stock. The tread-stock composition is usually so viscous that it will not flow easily during the casting of the body. It may be applied to the mold by troweling or the like, and a template similar to but longer than that described in Beneze U.S. Pat. No. 3,555,141 may be used.

In the molding of a tire, it may be found desirable to use a parting agent, such as a poly (methyl silicone) oil applied as an aerosol spary to the inner surfaces of the mold to aid in separation of the molded product from the mold.

The following examples are illustrative of the invention. The claims are not limited thereto.

Identification of materials used is as follows:

| | | |
|---|---|---|
| Adiprene L-167 | = | Liquid polytetrahydrofuran, isocyanate terminated, 6.3% NCO. Sp. gr. 1.07±02 obtained from DuPont. |
| ARCO CS-15 | = | Hydroxy-terminated, liquid butadiene/styrene copolymer, sold by ARCO Chemical Co. |
| DiCup R | = | Dicumyl peroxide, sold by Hercules. |
| Epoxy Resin/ Carbon Black Blend V-780 | = | 10/90 carbon black (epoxy resin paste sold by the Color Division of Ferro Corp.) |
| Ethyl 702 | = | 4,4'-methylenebis(2,6-di-t-butylphenol), an antioxidant manufactured by Ethyl Corp. |
| Hi-Sil 233 | = | Precipitated hydrated silica; less than 325 mesh, manufactured by Pittsburgh Plate Glass Co. |
| Hylene-T | = | Toluene diisocyanate (at least 96% 2,4-isomer, balance 2,6-isomer) DuPont. |
| Isonate 143L | = | Similar to diphenylmethane diisocyanate. (Upjohn) |
| Isonol C100 | = | N,N-bis(2-hydroxypropyl)aniline. (Upjohn) |
| ISAF Black | = | Intermediate super abrasion oil-furnace black. |
| Jeffamine D-2000 | = | Amino-terminated polyoxypropylene, sold by Jefferson Chem. Co. |
| MOCA | = | Methylene-bis-ortho-chloro-aniline sold by DuPont. |
| SAF Black | = | Super abrasion furnace black. |
| Shell Dutrex 916 | = | Rubber processing oil sold by Shell Oil Co. |
| Silicone Oil DC-200 | = | Silicone type oil sold for mold lubricant manufactured by Dow-Corning Company. |
| TENAMENE 4 | = | N,N'-Bis(1,4-dimethylpentyl)-p-phenylenediamine, sold by Eastman Kodak Co. |

The properties reported below were determined by the following recognized tests:

| | | |
|---|---|---|
| Compression set | = | ASTM D-395 Method B. |
| DOT Endurance | = | Department of Transportation MVSS109 Endurance Test. |
| Firestone Flexometer | = | ASTM D-623-62 Method B. |
| Adhesion | = | ASTM D-413-39, machine method, strip specimens. |
| 100% or 300% Modulus; Tensile Strength; Ultimate Elongation: | = | ASTM D-412 62T Die "C" |
| Ring Tear (Crescent tear) | = | ASTM D-624-54 Die "B" |
| Shore "A" Hardness Stanley-London | = | ASTM D-2240-64T |
| Wet Skid Resistance | = | ASTM E-303-69 |
| Steel Ball Rebound | = | J. H. Dillon, I. B. Prettyman and G. L. Hall, J. Appl. Phys., 15, 309 (1944) |

In the examples and elsewhere, "parts" refers to parts by weight per 100 parts of polymer, but in referring to classes of materials, such as diisocyanates generally, for example, it will be appreciated that the different members of any class of additives and also the polymers will have different molecular weights, so that the amounts given are to be considered suggestive.

In the one tire example (Example 1) that follows, two sets of properties are given: laboratory vulcanizate properties and tire tread performance results. Bot sets of results came from the cure of the same mix of tread. Since many tires were made for this example, average results are given for laboratory vulcanizate properties.

The other examples were not made into tires; however, they are suitable for tire treads.

The example which refers to the production of a tread, includes the results of tests made on a tire having a tread formed as separately indicated and a tire body prepared from the following:

| | PARTS BY WEIGHT |
|---|---|
| Adiprene L-167 | 100 |
| Silicone Oil DC-200 | 0.1 |
| Epoxy Resin/Carbon Black Blend ("V-780") | 2.5 |
| Di(2-ethylhexyl)phthalate | 20 |
| MOCA | 19, 20 or 21 |

A special color may be used in the tire body and a compounding ingredient such as Epoxy Resin/Carbon Black Blend V-780 may be used. The variation in MOCA content was due to batch to batch variations in per cent NCO in the Adiprene L-167, more MOCA being used for the stocks of higher NCO content.

The recipe is illustrative only, and other stocks may be used in which there are elastomers with sites reactive with the reactive sites in the tread compounds. Alternatively, a conventional tire body may be positioned against the tread, using an adhesive if necessary.

The body stock was prepared in a stainless steel pressure vessel provided with a power stirrer, a heating and a cooling jacket, connections for supplying nitrogen and for pulling a vacuum in the free space of the vessel, and a valved discharge conduit at the bottom of the vessel. The prepolymer and all ingredients except the MOCA were charged together into the vessel under a blanket of nitrogen, and the vessel closed. A vacuum of 3-5 mm. absolute was then pulled on the vessel, and the contents agitated and heated at 162° F. (72° C.) for 2 hours, after which the vessel was opened and the free space in the vessel flooded with nitrogen. The MOCA was melted, supercooled to 99° F. and added to the vessel with stirring. The vaccum was then reapplied, and the mixture stirred for 3 minutes. Nitrogen pressure was then introduced into the vessel, and the contents blown out through the discharge conduit into a mold against the tread stock previously applied to the tread of the mold. The centrifugal rotation of the mold and the oven temperature were maintained at 250° F. for 2 hours, after which the rotation was continued in open air to cool the mold. At the end of this time, the rotation was stopped, and the tire stripped from the mold. Most treads are completely cured during this cycle.

EXAMPLE 1

RECIPE:
| | | |
|---|---|---|
| 62.9 | parts | ARCO CS-15 |
| 37.1 | do. | Jeffamine D-2000 |
| 31.5 | do. | ISAF |
| 1.0 | do. | Ethyl 702 |
| 0.05 | do. | Dibutyl tin dilaurate |
| 10.32 | do. | Hylene-T |
| NCO/[OH and NHR] 1.50 | | |

PHYSICAL PROPERTIES:
Stress-Strain Properties — Cured 60'/225° F. + 120'/250° F.

| | | |
|---|---|---|
| 300% Modulus, psi | — | — |
| Tensile Strength, psi | — | 1625 |
| Ultimate Elongation, % | — | 230 |
| 212° F. Tensile Strength | — | 430 |

212° F. Crescent Tear — Cured 60'/225° F. + 120'/250° F.

| | | |
|---|---|---|
| Lbs./in. | — | 20 |

Rebound — Cured 60'/225° F. + 120'/250° F.

| | | |
|---|---|---|
| % at 73° F. | — | 49 |
| % at 212° F. | — | 62 |

Shore "A" Hardness — Cured 60'/225° F. + 120'/250° F. — 57
Firestone Flexometer Test — Cured 60'/225° F. + 120'/250° F.

| | | |
|---|---|---|
| Running Temperature, °F. | — | 250 |
| Blow-out Time, min. | — | >60 |
| Stanley-London Wet Skid Resistance — | | Standard |
| Cured 180'/212° F. | | Firestone Control |

| | | |
|---|---|---|
| C.F. | — | 39 | 41 |
| Index | — | 96 | 100 |

Compression Set - 22 Hrs./158° F. —
Cured 60'/225° F. + 120'/250° F.

| | | |
|---|---|---|
| % | — | 17 |

Adhesion to Cast Tire Body Stock — Pre-set — 10'/212° F.
Cured 180'/212° F.

| | | |
|---|---|---|
| Lbs./in.: 73° F. | — | 65) laboratory batch |
| 250° F. | — | 14) |

CURE CYCLE FOR TREAD

The uncured tread was applied to the mold with a template at 165° F. This template was similar to, but longer than the one used in Beneze U.S. Pat. No. 3,555,141. The tread was pre-set for 36 minutes at 225° F., and then various assembly operations were performed on the experimental mold for the next 62 minutes. The tread and mold were then reheated for 8 minutes at 225° F., the body was cast, and heating was continued for 20 minutes at 225° F. After this the main cure of 2 hours at 250° F. was applied, after which the tire was spin-cooled for an additional hour.

TIRE TREAD PROPERTIES:
| | |
|---|---|
| DOT Endurance | — 1700 miles (passes DOT) |
| Wear Tests | — 26 mi./mil, moderate severity (Control = 68) |
| Tire Size E 78-14 | |

EXAMPLE 1

This tread recipe is an example of a blend of ARCO CS-15 and polyoxypropylene which is amino-terminated (Jeffamine D-2000). In such treads anywhere from any substantial amount to 100 parts by weight of amino-terminated polyoxypropylene may be blended with 100 parts to any substantial amount of hydroxy-terminated butadiene-styrene (20 to 30/80 to 70)copolymer. Consequently both urethane and urea groups are produced in the chain extension, and both allophanate and biuret groups are involved in crosslinking. The tire passed the DOT Endurance test and also wear-tested on a car on a course of moderate severity. Wear performance was poor.

EXAMPLES 2 THROUGH 5

RECIPE:
| | | |
|---|---|---|
| 100 | parts | Jeffamine D-2000 |
| 10 | do. | Shell Dutrex 916 |
| 1 | do. | Ethyl 702 |

| Example No. | 2 | 3 | 4 | 5 |
|---|---|---|---|---|
| Dibutyl tin dilaurate, phr | 0.05 | 0 | 0 | 0 |
| HiSil 233, phr | 50 | 0 | 0 | 0 |
| SAF Black, phr | 0 | 50 | 0 | 50 |
| ISAF Black, phr | 0 | 0 | 50 | 0 |
| Isonol C-100, phr | 0 | 0 | 10 | 0 |
| Hylene-T, phr | 15.09 | 20.09 | 34.90 | 0 |
| Isonate 143L, phr | 0 | 0 | 0 | 30.98 |
| NCO/NH$_2$ | 1.65 | 2.20 | — | 2.00 |
| NCO/[OH + NH$_2$] | — | — | 2.00 | — |

PHYSICAL PROPERTIES:
Stress-Strain Properties —
Cured 45'/280° F.

| | | | | |
|---|---|---|---|---|
| 100% Modulus, psi | — | 775 | — | 1425 |
| Tensile Strength, psi | — | 3125 | 2900 | 2975 |
| Ultimate Elongation, % | — | 400 | 100 | 170 |

Rebound — Cured 45 to 60'/280° F.

| | | | | |
|---|---|---|---|---|
| % at 73° F. | 43 | 38 | 24 | 30 |
| % at 212° F. | 30 | 42 | 49 | 59 |

Shore A Hardness — Cured 45 to 60'/280° F.

| | | | | |
|---|---|---|---|---|
| | 81 | 71 | 77 | 72 |

Examples 2 through 5 show that a variety of reinforcing agents may be used in the tread stock. Four different reinforcing agents are used in these examples: ISAF black, SAF black, silica, and Isonol C-100. Isonol C-100 modifies the polymer chain by introduction of short, nonflexible segments which are mixed with the flexible polymer segments. it would act as a reinforcing agent if no carbon black were present. Tenamene-4, used in other recipes, acts similarly. Note also the two different diisocyanates used.

Note also that in these examples, as in all the others, unusually high NCO/[OH + NHR] ratios are used to produce good vulcanizates. In many cases the ratio is 2.0 or greater. In all cases one-step urea-urethane reactions were employed, and it is surprising that good cures resulted.

EXAMPLE 6

| RECIPE: | 62.9 | parts | ARCO CS-15 |
|---|---|---|---|
| | 37.1 | do. | Jeffamine D-2000 |
| | 31.5 | do. | SAF black |
| | 10 | do. | Shell Dutrex 916 |
| | 1 | do. | Ethyl 702 |
| | 0.05 | do. | Dibutyl tin dilaurate |
| | 15.71 | do. | Hylene-T |
| | NCO/[OH + NH$_2$] 2.30 | | |

PHYSICAL PROPERTIES:

Stress-Strain Properties — Cured 45'/280° F.

| Tensile Strength, psi | — | 3000 |
|---|---|---|
| Ultimate Elongation, % | — | 280 |

Rebound — Cured 45'/280° F.

| % at 73° F. | — | 39 |
|---|---|---|
| % at 212° F. | — | 56 |

Shore A Hardness — Cured 45'/280° F.

| | — | 68 |
|---|---|---|

Example 6 shows that oil may be added to the tread recipes and still give good cures.

EXAMPLE 7

| RECIPE: | 100 | parts | ARCO CS-15 |
|---|---|---|---|
| | 50 | do. | ISAF black |
| | 0.05 | do. | Dibutyl tin dilaurate |
| | 1 | do. | Ethyl 702 |
| | 13.2 | do. | Tenamene-4 |
| | 17.7 | do. | Hylene-T |
| | NCO/[OH + NHR] 1.4 | | |

PHYSICAL PROPERTIES:

Stress-Strain Properties — Cured 50'/300°F. plus 30'/212°F.

| 100% Modulus, psi | — | 1775 |
|---|---|---|
| Tensile Strength, psi | — | 3400 |
| Ultimate Elongation, % | — | 200 |

Rebound — Cured 70'/300° F. plus 30'/212°F.

| % at 73° F. | — | 42 |
|---|---|---|
| % at 212° F. | — | 52 |

Shore A Hardness — Cured 70'/300° F. plus 30'/212° F.

| | — | 84 |
|---|---|---|

Example 7 shows a tread recipe derived from a blend of a hydroxy-terminated polymer and a non-polymeric diamino compound.

EXAMPLE 8

| RECIPE: | 100 | parts | ARCO CS-15 |
|---|---|---|---|
| | 50 | do. | ISAF black |

EXAMPLE 8 — Continued

| | 15 | do. | Shell Dutrex 916 |
|---|---|---|---|
| | 1 | do. | Ethyl 702 |
| | 0.05 | do. | Dibutyl tin dilaurate |
| | 14.1 | do. | Tenamene-4 |
| | 2 | do. | DiCup R |
| | 17.54 | do. | Hylene-T |
| | NCO/[OH + NHR] 1.50 | | |

PHYSICAL PROPERTIES:

Stress-Strain Properties — Cured 45'/280° F.

| 300% Modulus, psi | — | 2175 |
|---|---|---|
| Tensile Strength, psi | — | 2350 |
| Ultimate Elongation, % | — | 330 |

Rebound — Cured 60'/280° F.

| % at 73° F. | — | 30 |
|---|---|---|
| % at 212° F. | — | 31 |

Shore A Hardness — Cured 60'/280° F.

| | — | 66 |
|---|---|---|

Example 8 shows a tread recipe derived from a blend of hydroxyterminated polymer and a non-polymeric diamino compound and the use of an auxiliary peroxide cure.

I claim:

1. A tread for a pneumatic tire composed of (a) an elastomeric polyisocyanate reaction product of an amino-terminated polyoxyalkylene in which each alkylene group contains 2 to 4 carbon atoms or (b) a diisocyanate reaction product of a blend of polyhydroxy butadiene-styrene copolymer and amino-terminated polyoxypropylene, and containing at least 30 parts of reinforcing pigment per 100 parts of the reaction product, the ratio of NCO/(OH+NH$_2$) being at least 1.15.

2. The process which comprises producing in the tread portion of a tire mold, the reaction of a polyhydroxy butadiene-styrene copolymer and an amino-terminated polyoxyalkylene in which each alkylene group contains 2 to 4 carbon atoms, with a polyisocyanate the ratio of NCO/(OH+NH$_2$) being at least 1.15, with the reaction mixture containing at least 30 parts of reinforcing pigment per 100 parts of said reaction product.

3. A pneumatic tire, the tread and sidewalls of which are composed of different elastomers, the tread of which is a peroxide-cured reaction product of a polyhydroxy butadiene-styrene copolymer and amino-terminated polyoxyalkylene in which each alkylene group contains 2 to 4 carbon atoms, with a polyisocyanate the ratio of NCO/(OH+NH$_2$) being at least 1.15, with the reaction mixture containing at least 30 parts of reinforcing pigment per 100 parts of said reaction product.

* * * * *